(12) United States Patent
Maldonado et al.

(10) Patent No.: US 11,052,520 B2
(45) Date of Patent: Jul. 6, 2021

(54) SEAL INSTALLATION TOOL

(71) Applicant: Raytheon Technologies Corporation, Farmington, CT (US)

(72) Inventors: Billie Rosalie Maldonado, Amesbury, MA (US); Thomas Freeman, Kennebunk, ME (US); John Pergantis, Manchester, CT (US); Anthony Valenti, Wolcott, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 41 days.

(21) Appl. No.: 16/452,651

(22) Filed: Jun. 26, 2019

(65) Prior Publication Data
US 2020/0406437 A1 Dec. 31, 2020

(51) Int. Cl.
*B25B 27/00* (2006.01)
*F01D 25/16* (2006.01)

(52) U.S. Cl.
CPC .......... *B25B 27/0028* (2013.01); *F01D 25/16* (2013.01); *F05D 2220/32* (2013.01); *F05D 2240/50* (2013.01); *F05D 2240/55* (2013.01); *F05D 2260/98* (2013.01)

(58) Field of Classification Search
CPC .......... B25B 27/0028; Y10T 29/49826; Y10T 29/53657
See application file for complete search history.

(56) References Cited

U.S. PATENT DOCUMENTS

| | | | | |
|---|---|---|---|---|
| 2,807,079 | A * | 9/1957 | Josephson | B25B 27/0028 29/235 |
| 4,551,898 | A * | 11/1985 | Provost | B25B 27/0028 29/235 |
| 5,709,018 | A * | 1/1998 | Dugan | B23P 19/084 29/235 |
| 6,349,459 | B1 | 2/2002 | Dean | |
| 9,969,069 | B2 * | 5/2018 | Pergantis | F16J 15/021 |
| 2007/0186399 | A1 | 8/2007 | Bussell et al. | |
| 2016/0312656 | A1 | 10/2016 | Pergantis et al. | |

FOREIGN PATENT DOCUMENTS

| | | |
|---|---|---|
| CN | 202212928 U | 5/2012 |
| CN | 203831341 U | 9/2014 |
| JP | 2010-156368 A | 7/2010 |

OTHER PUBLICATIONS

European Search Report for European Application No. 20179080.5 dated Nov. 6, 2020.

* cited by examiner

*Primary Examiner* — Jason L Vaughan
*Assistant Examiner* — Amanda Kreiling
(74) *Attorney, Agent, or Firm* — Carlson, Gaskey & Olds, P.C.

(57) ABSTRACT

A method of installing a seal in a bore of a component includes securing a base plate to a component. The method includes arranging the seal onto a pusher. The method also includes inserting the pusher into a hole in the base plate. The method further includes installing a hub onto the base plate and over the pusher. The method further includes rotating a rod relative to the hub to advance the pusher and seat the seal in the bore.

17 Claims, 3 Drawing Sheets

SEAL INSTALLATION TOOL

BACKGROUND

The disclosure relates to an installation tool for installing a seal into a bore of a component.

In one example application, a bearing housing for a gas turbine engine includes a bore that receives a seal. An oil tube having a flange is bolted to a boss surrounding the bore such that the seal engages the oil tube. The seal can become damaged if alignment of the seal with respect to the bore is not maintained as the seal is pushed into the bore, creating a leak subsequent to assembly.

To ensure proper seal installation, various seal installation tools have been used. One example tool is a one-piece 3-D printed tool with an annular flange extending from a base, which entirely circumscribes the flange. The seal is arranged on the flange, and the base is carefully bolted to the boss, forcing the seal into the bore. However, the bolts must either be tightened simultaneously or each a little bit at a time to ensure the seal alignment is maintained.

Another seal installation tool includes a bracket that is secured to the boss using bolts. A handle is rotated to slide a block within the bracket. A separate seal pusher is arranged between the block through a hole in the bracket, which entirely circumscribes the hole. The seal is arranged on the pusher. Rotating the handle advances the pusher and seal into the bore.

Both of the typical seal installation tools do not provide any visibility to the seal during installation and are associated with various other drawbacks.

SUMMARY

In one exemplary embodiment, a method of installing a seal in a bore of a component includes securing a base plate to a component. The method includes arranging the seal onto a pusher. The method also includes inserting the pusher into a hole in the base plate. The method further includes installing a hub onto the base plate and over the pusher. The method further includes rotating a rod relative to the hub to advance the pusher and seat the seal in the bore.

In a further embodiment of any of the above, the securing step includes abutting a boss of the component with the base plate and the bore in the boss. The method includes a step of clamping the base plate to the boss by securing bolts to the base plate.

In a further embodiment of any of the above, the clamping step includes inserting the bolts from a side opposite the boss at an interior of the component.

In a further embodiment of any of the above, the securing step includes providing a window in the base plate that leaves the seal visible through the window subsequent to the inserting step.

In a further embodiment of any of the above, the method includes the step of observing longitudinal movement of the seal past the window toward the bore.

In a further embodiment of any of the above, the pusher includes first and second diameter portions that form a first shoulder. The arranging step includes sliding the seal onto the first diameter portion and into abutment with the first shoulder.

In a further embodiment of any of the above, the pusher includes a third diameter portion that forms a second shoulder with the second diameter portion. The hole includes a stop that abuts the second shoulder in a fully installed seal position.

In a further embodiment of any of the above, the pusher includes first and second pusher portions. The first and second diameter portions are provided on the first pusher portion. The third diameter portion is provided on the second pusher portion. The first and second pusher portions are secured to one another by a fastener.

In a further embodiment of any of the above, the rotating step slides the first diameter portion into the bore in a slip fit relationship.

In a further embodiment of any of the above, the installing step includes threading the hub onto a collar of the base plate.

In a further embodiment of any of the above, the installing step includes receiving an end of the rod in a pocket of the pusher in a slip fit relationship.

In a further embodiment of any of the above, the rotating step includes threadingly rotating the rod relative to the hub.

In a further embodiment of any of the above, the rotating step includes tightening the rod until the second should contacts the stop.

In another exemplary embodiment, a seal installation tool includes a base plate having a hole. The base plate has a window that adjoins the hole. A pusher has first and second diameter portions that form a shoulder. The first diameter portion is configured to carry a seal against the shoulder. The pusher is arranged in the hole in a slip fit relationship. A hub is removeably secured to the base plate over the pusher. A rod is threadingly received by the hub for relative rotation thereto. An end of the rod cooperates with the pusher. The rod is configured to longitudinally slide the pusher relative to the base plate.

In a further embodiment of any of the above, the base plate includes threaded holes that are configured to receive bolts that clamp the base plate to a component having a bore that receives the seal.

In a further embodiment of any of the above, the pusher includes a third diameter portion that forms a second shoulder with the second diameter portion. The hole includes a stop that abuts the second shoulder in a fully installed seal position.

In a further embodiment of any of the above, the pusher includes first and second pusher portions. The first and second diameter portions are provided on the first pusher portion. The third diameter portion is provided on the second pusher portion. The first and second pusher portions are secured to one another by a fastener.

In a further embodiment of any of the above, the first and second pusher portions are different materials.

In a further embodiment of any of the above, the pusher includes a pocket that receives an end of the rod in a slip fit relationship.

In a further embodiment of any of the above, the base plate includes a collar. The hub is threadingly secured to the collar.

In a further embodiment of any of the above, the seal is aligned with the window in an uninstalled seal position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
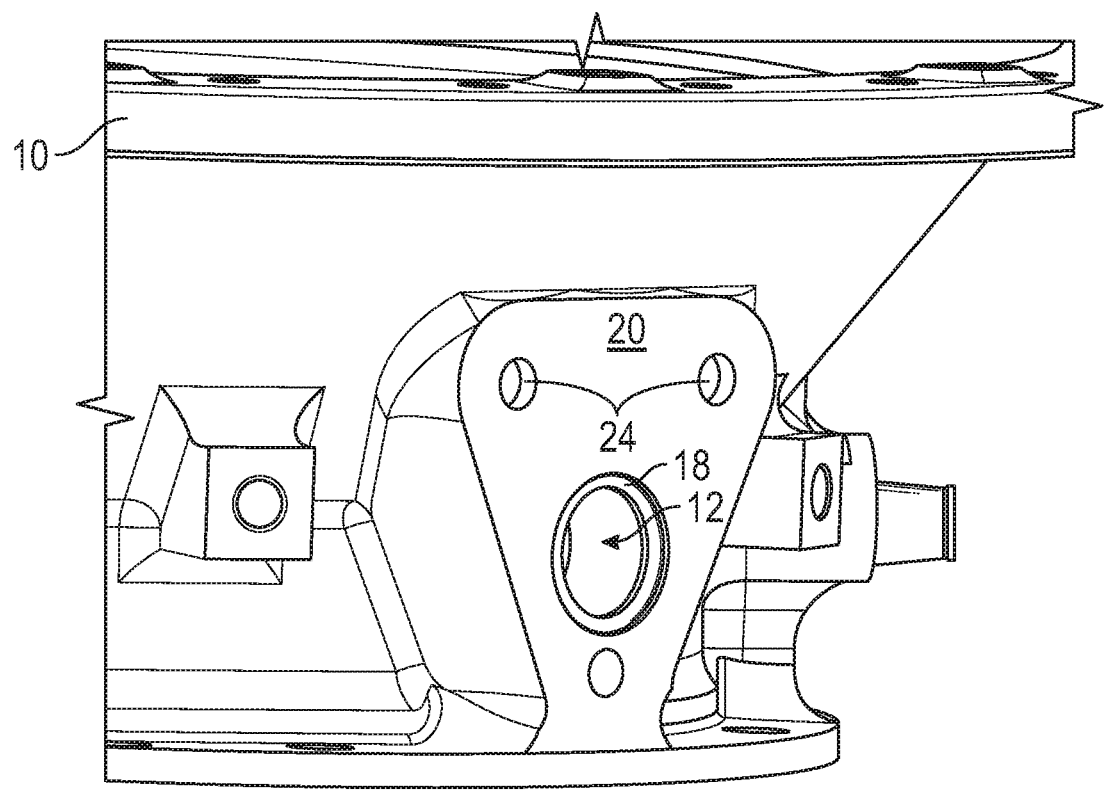
FIG. 1A is a perspective view of a component having a bore with a seal that is fully installed and seated.
Figure 1B:
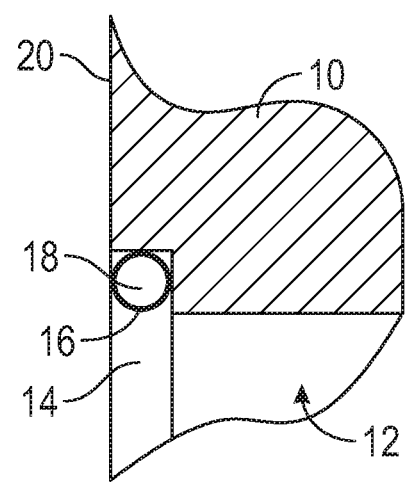
FIG. 1B is a cross-section through the bore and seal as shown in FIG. 1A.

Referring to FIGS. 1A and 1B, a component 10, such as a gas turbine engine bearing housing, includes one or more bores 12 for communicating a fluid such as lubricating oil to the interior of the component. The component 10 includes a boss 20 providing a flat surface to which an oil tube is secured at holes 24, which may be threaded or non-threaded. The bore 12 includes an annular recess 14 providing a shoulder 16. A seal 18 is inserted into the bore 12 and is a small distance away from the shoulder 16 when in a fully installed position.

Figure 2A:
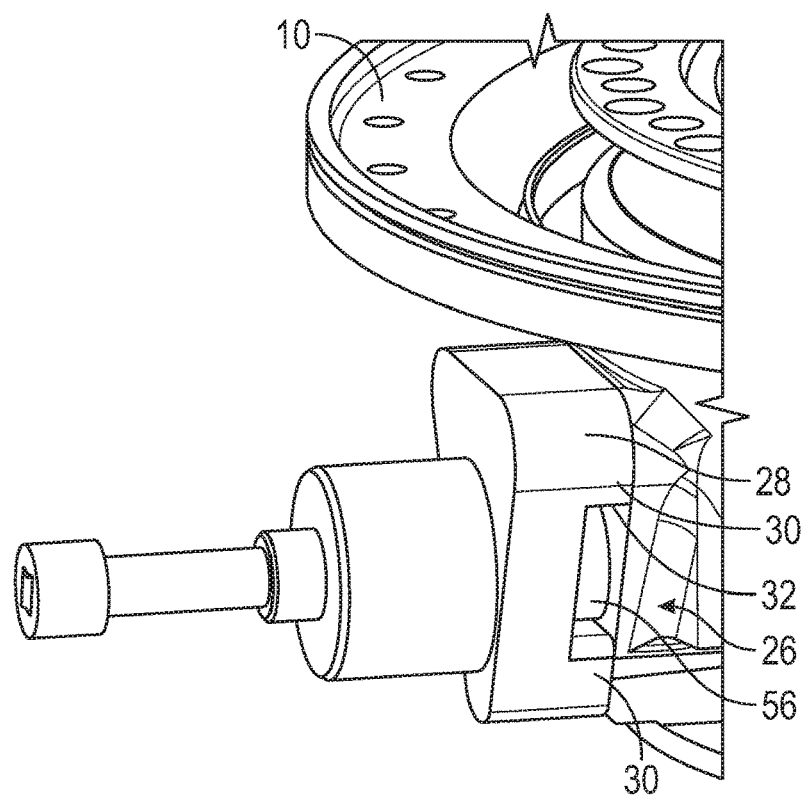
FIG. 2A is a perspective view of one example seal installation tool according to the disclosure.

A seal installation tool 26 is used to insert the seal 18 into the bore 12 while maintaining desired alignment, as shown in FIG. 2A. The tool 26 includes a base plate 28 having standoffs 30 separated by a window 32 that provides an unobstructed view to an interior portion of the tool at an entrance to the bore 12. The seal 18 is mounted to a pusher 56 supported by the base plate 28. This window 32, provided on each of opposing sides of the base 28, for example, enables the operator to view the seal 18 as it moves longitudinally into the bore 12 during installation so that the seal 18 can be checked for proper alignment.

Figure 2B:
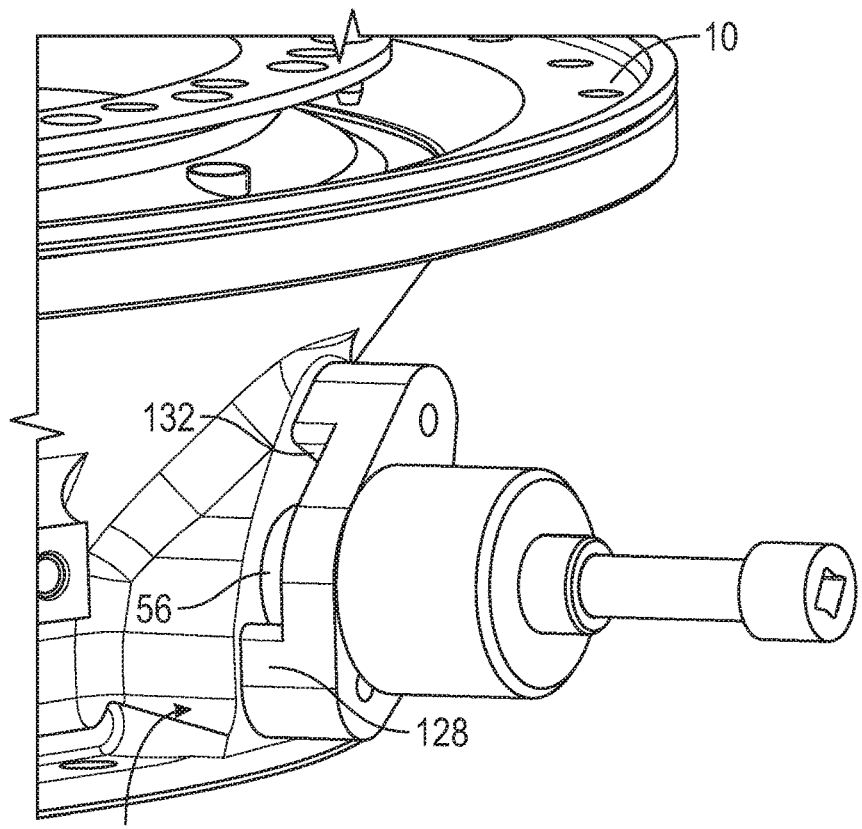
FIG. 2B is a perspective view of another example seal tool according to the disclosure with a different base plate than shown in FIG. 2A.

Another seal installation tool 126 having windows 132 is illustrated in FIG. 2B. The tool 126 uses a different base plate 128 than that of the seal installation tool 26. Otherwise, all of the remaining components may be interchangeable such that a kit containing multiple base plates for a particular component may be provided.

Figure 3A:
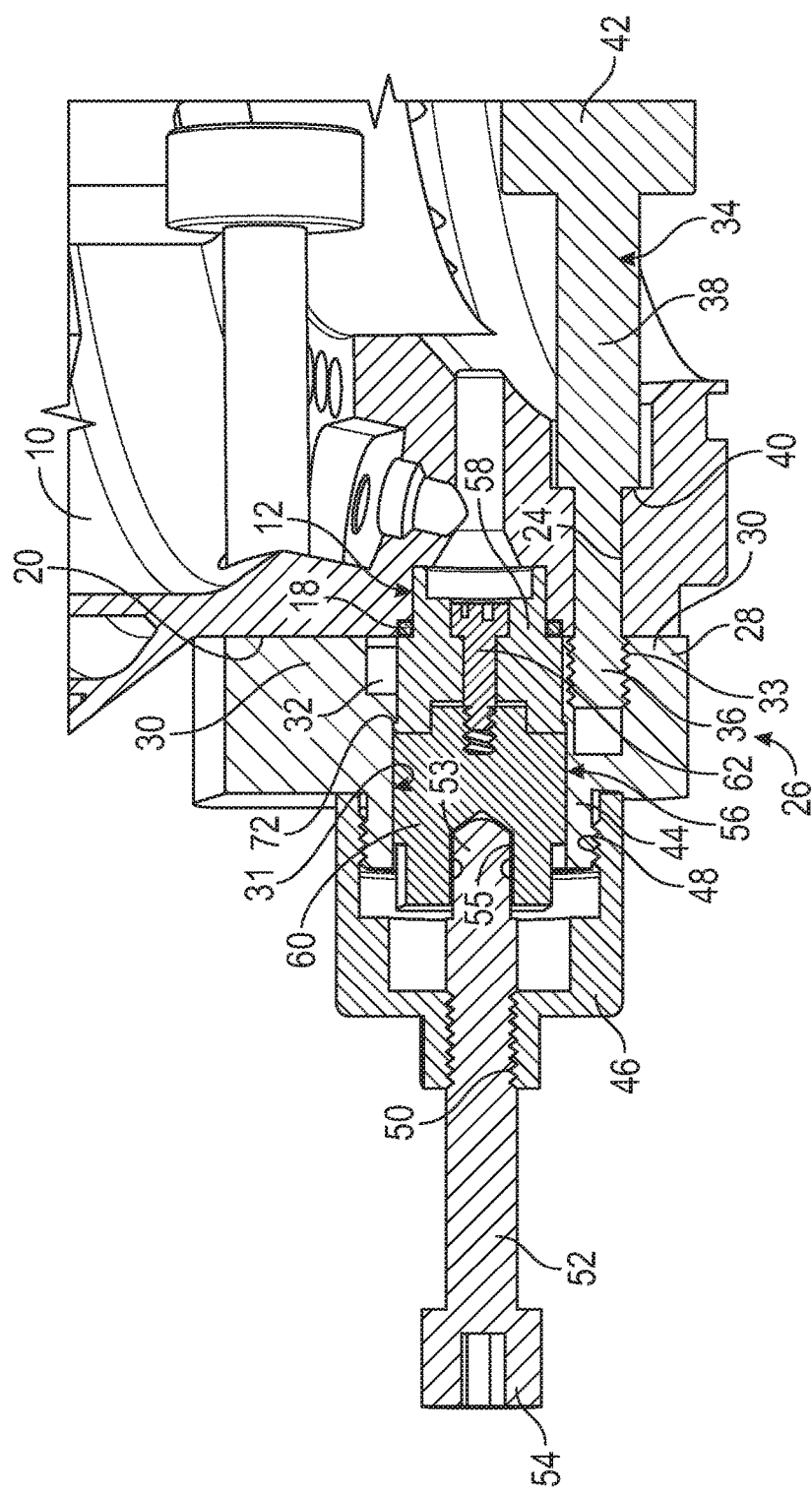
FIG. 3A is a cross-sectional view through the seal installation tool shown in FIG. 2A.

Referring to FIG. 3A, the base plate 28 includes a hole 31 that receives the pusher 56. The window 32 extends all the way to the hole 31 to provide visibility to an end of the pusher 56 on which the seal 18 is mounted. The base plate 28 is clamped to the boss 20 by bolts 34. A threaded end 36 of the bolts 34 is received in holes 33. A shank 38 on each bolt 34 has a shoulder 40 that engages a backside of the component 10. Knobs 42 may be provided on the bolts 34 to enable hand tightening by the operator.

A collar 44 is provided on the base plate 28, and a hub 46 is threadingly secured to the collar 44 at a threaded inner diameter 48 of the hub 46. The hub 46 encloses the pusher 56.

A rod 52 is threadingly received in a hole 50 of the hub 46 for relative rotation thereto. One end 53 of the rod 52 is received within a pocket 55 of the pusher 56 in a slip fit relationship. Another end 54 of the rod 52 is configured to cooperate with a tool, such as a torque wrench.

Figure 3B:
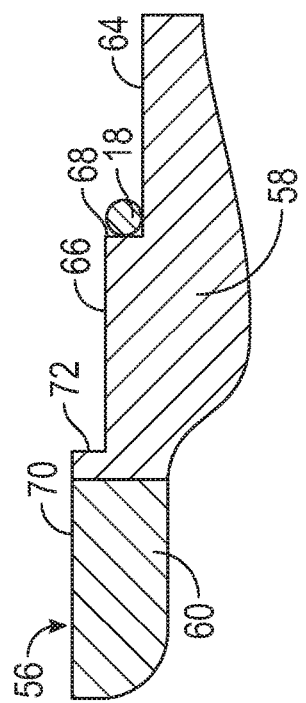
FIG. 3B is a partial cross-sectional view of a pusher shown in FIG. 3A.

Referring to FIGS. 3A and 3B, the pusher 56 includes first and second pusher portions 58, 60, which are secured to one another by a fastener 62 in the example. The pusher 56 includes first and second diameter portions 64, 66 that form a shoulder 68. The seal 18 is arranged on the first diameter portion 64 and in abutment with the shoulder 68. A third diameter portion 70 forms a second shoulder 72 with the second diameter portion 66. The hole 31 in the base plate 28 provides a stop 74 against which the second shoulder 72 abuts during full extension of the pusher 56.

During installation, the base plate 28 is secured to the component 10 using the bolts 34 to clamp the base plate 28 to the boss 20. In one example, the bolts 34 are inserted from a side opposite the boss 20 and the interior of the component 10.

The seal 18 is arranged onto the pusher 56. The pusher 56 is inserted into the hole 31 in the base plate 28, and the hub 46 is installed onto the collar 44 and over the pusher 56. At this point, the seal 18 is visible through the windows 32.

The rod 52 is rotated relative to the hub 46 to advance the pusher 56 and seat the seal 18 in the bore 12 while maintaining desired alignment. The end 53 of rod 52 spins freely within the pocket 55. During installation, the operator observes the seal 18 as it moves longitudinally past the window 32 and into the bore 12. The rod 52 is torqued by a tool (e.g., wrench) at the end 54 until it the shoulder 72 hits stop 74. This prevents the seal from rolling inward should the seal come in contact with the radius in the corner of shoulder 16. The torque measurement from the wrench is used to inform mechanic of potential damage to the seal. The tool 26 is removed from the boss 20, and proper seal installation can be confirmed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of installing a seal in a bore of a component, comprising:
   securing a base plate to the component, wherein the securing step includes abutting a boss of the component with the base plate, the bore is arranged in the boss;
   clamping the base plate to the boss by securing bolts to the base plate;
   arranging the seal onto a pusher;
   inserting the pusher into a hole in the base plate, wherein the securing step includes providing a window in the base plate that leaves the seal visible through the window subsequent to the inserting step;
   installing a hub onto the base plate and over the pusher; and rotating a rod relative to the hub to advance the pusher and seat the seal in the bore.

2. The method of claim 1, wherein the clamping step includes inserting the bolts from a side opposite the boss at an interior of the component.

3. The method of claim 1, comprising the step of observing longitudinal movement of the seal past the window toward the bore.

4. A method of installing a seal in a bore of a component, comprising:
   securing a base plate to the component;
   arranging the seal onto a pusher, wherein the pusher includes first and second diameter portions that form a first shoulder, the arranging step includes sliding the seal onto the first diameter portion and into abutment with the first shoulder, wherein the pusher includes a third diameter portion forming a second shoulder with the second diameter portion;
   inserting the pusher into a hole in the base plate, and the hole includes a stop that abuts the second shoulder in a fully installed seal position;
   installing a hub onto the base plate and over the pusher; and
   rotating a rod relative to the hub to advance the pusher and seat the seal in the bore.

5. The method of claim 4, wherein the pusher includes first and second pusher portions, the first and second diameter portions provided on the first pusher portion, and the third diameter portion provided on the second pusher portion, the first and second pusher portions secured to one another by a fastener.

6. The method of claim 4, wherein the rotating step slides the first diameter portion into the bore in a slip fit relationship.

7. The method of claim 4, wherein the rotating step includes tightening the rod until the second shoulder contacts the stop.

8. A method of installing a seal in a bore of a component, comprising:
   securing a base plate to the component;
   arranging the seal onto a pusher;
   inserting the pusher into a hole in the base plate;
   installing a hub onto the base plate and over the pusher, wherein the installing step includes threading the hub onto a collar of the base plate; and
   rotating a rod relative to the hub to advance the pusher and seat the seal in the bore.

9. The method of claim 8, wherein the installing step includes receiving an end of the rod in a pocket of the pusher in a slip fit relationship.

10. The method of claim 9, wherein the rotating step includes threadingly rotating the rod relative to the hub.

11. A seal installation tool for installing a seal in a boss of a component having a bore, the tool comprising:
    a base plate having a hole, the base plate having a window adjoining the hole, wherein the base plate is configured to be clamped and secured to the component with bolts such that the base plate is in abutment with the boss;
    a pusher having first and second diameter portions that form a shoulder, the first diameter portion configured to carry the seal against the shoulder, wherein the seal is aligned with and visible through the window in an uninstalled seal position, the pusher arranged in the hole in a slip fit relationship;
    a hub removeably secured to the base plate over the pusher; and
    a rod threadingly received by the hub for relative rotation thereto, an end of the rod cooperating with the pusher, the rod configured to longitudinally slide the pusher relative to the base plate and seat the seal in the bore.

12. The tool of claim 11, wherein the base plate includes threaded holes configured to receive the bolts that clamp the base plate to the component having the bore receiving the seal.

13. The tool of claim 11, wherein the pusher includes a third diameter portion forming a second shoulder with the second diameter portion, and the hole includes a stop that abuts the second shoulder in a fully installed seal position.

14. The tool of claim 11, wherein the pusher includes first and second pusher portions, the first and second diameter portions provided on the first pusher portion, and the third diameter portion provided on the second pusher portion, the first and second pusher portions secured to one another by a fastener.

15. The tool of claim 14, wherein the first and second pusher portions are different materials.

16. The tool of claim 11, wherein the pusher includes a pocket that receives an end of the rod in a slip fit relationship.

17. The tool of claim 11, wherein base plate includes a collar, and the hub is threadingly secured to the collar.

* * * * *